April 6, 1926.
M. S. CORBETT
APPARATUS FOR MAKING ICE
Filed August 23, 1923
1,579,437
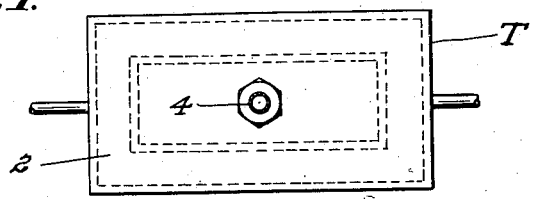
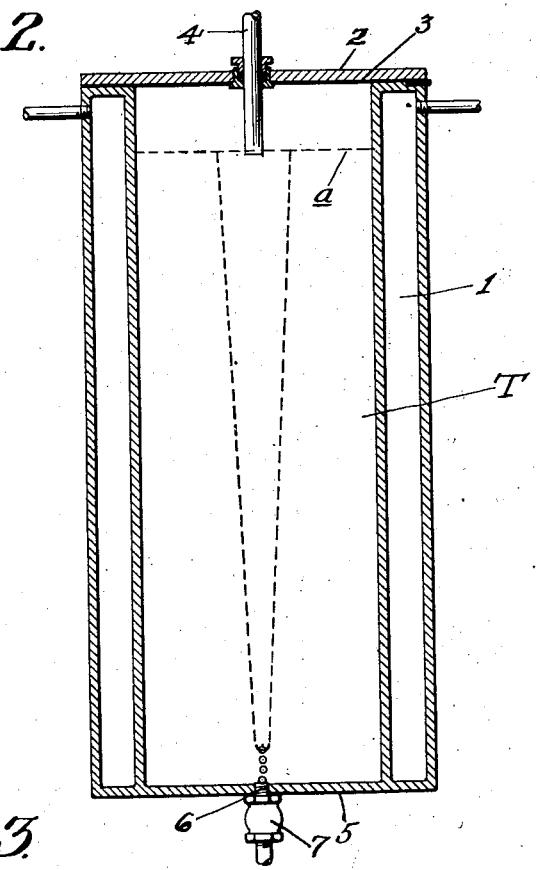
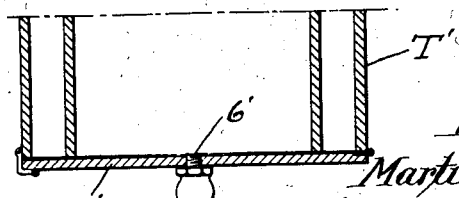
Inventor:
Martin S. Corbett.
by Watson E. Coleman
Attorney Patented Apr. 6, 1926.

1,579,437

UNITED STATES PATENT OFFICE.

MARTIN S. CORBETT, OF GLASSBORO, NEW JERSEY.

APPARATUS FOR MAKING ICE.

Application filed August 23, 1923. Serial No. 659,024.

*To all whom it may concern:*

Be it known that I, MARTIN S. CORBETT, a citizen of the United States, residing at Glassboro, in the county of Gloucester and State of New Jersey, have invented certain new and useful Improvements in Apparatus for Making Ice, of which the following is a specification, reference being had to the accompanying drawings.

This invention relates to an apparatus for making ice and it is an object of the invention to provide a novel and improved apparatus of this general character embodying vacuum means whereby the core or sediment within the ice being formed is effectively removed.

It is also an object of the invention to provide a novel and improved apparatus of this general character wherein water is employed to facilitate the removal of the sediment or core.

The novel features of my invention will hereinafter be definitely claimed.

In order that my invention may be the better understood, I will now proceed to describe the same with reference to the accompanying drawings, wherein:—

Figure 1 is a view in top plan of an apparatus constructed in accordance with an embodiment of my invention;

Figure 2 is a vertical sectional view taken through the structure as illustrated in Figure 1;

Figure 3 is a detailed sectional view illustrating another form of tank or can structure.

As disclosed in Figures 1 and 2 of the accompanying drawings, T denotes a tank or can of desired configuration and dimensions and which is adapted to be initially filled with the liquid to be frozen to substantially the level indicated in Figure 2 by the broken line *a*. The tank or can T proper is surrounded in a conventional manner by a jacket 1 adapted to receive a suitable refrigerating means such as ammonia or to receive hot gas to loosen the ice block molded or formed within the tank or can T. When the ice is frozen in the can T, the ice is loosened by discharging the hot gas from the high pressure line of the machine in the space shown for the refrigerant.

The upper end of the tank or can is open but is adapted to be closed by the hinged lid 2, the packing 3 being interposed between said lid and the adjacent end edges of the tank or can T when the lid is in closed position. Extending through the lid 2 and at substantially the axial center of the interior of the tank or can T when the lid 2 is closed is a pipe 4. This pipe 4, which is adjustable, leads from a vacuum pipe (not shown) of any preferred construction and has its inner or inserted end terminating below but in relatively close proximity to the initial level *a* of the liquid within the tank or can T. The bottom 5 of the tank or can T at substantially the axial center thereof has in communication therewith an induction pipe or nipple 6 in which is interposed a check valve 7 of a conventional type, said check valve being normally closed to prevent entrance of air or the like within the tank or can T. When the tank or can T is initially filled with water, the check valve 7 is closed. When the vacuum pump is operated a vacuum is created within the tank or can T above the water level *a* and which vacuum permits the atmospheric pressure to cause the check valve 7 to open.

The water within the tank or can T will also rise toward the vacuum pipe 4 and at the same time a current of air will be drawn through the pipe or nipple 6 into the tank or can T and up through the central portion of the liquid within said tank or can and out through the pipe 4 causing an agitation of the water.

The water within the tank or can T gradually freezes from the outside toward the center and which freezing action permits the core to be also withdrawn through the vacuum pipe.

As the water freezes so that the pipe or nipple 6 no longer admits air the middle portion of the water will be drawn out by the vacuum thus causing the water to gradually freeze in a cone shaped core and the sediment and air cells will all be drawn to the middle point and out through the vacuum pipe. As the cone shaped opening in the central portion of the congealing ice grows less the sediment works toward the vacuum pipe 4 and is withdrawn.

When the water is frozen to such point so that it is about to close the flow through the pipe 6 water may be forced within said tank or can through the pipe or nipple 6 to facilitate the forcing of the sediment or core toward the top or upper portion of the tank or can T and removed by pipe 4.

In Figure 3 of the accompanying drawings

I illustrate a structure for use in connection with my improved process wherein the lid 2' is provided at the lower end of the tank or can 1' with the nipple or pipe 6' carried thereby.

I claim:—

An apparatus for making ice comprising a tank adapted to be partially filled with water, means for subjecting said tank to a cooling medium, the lower portion of the tank having an opening in communication with the atmosphere, an inwardly opening check valve for controlling said opening, a pipe extending through the top of the tank at a point substantially above the opening in the bottom of the tank, the inserted end of the pipe terminating below the top of the tank, said tank being adapted for communication with means for creating suction to open the check valve for the passage of air through the water, said opening providing means to permit water to be drawn through the opening in the bottom of the tank upwardly through the material within the tank.

In testimony whereof I hereunto affix my signature.

MARTIN S. CORBETT.